(12) United States Patent
Zhang et al.

(10) Patent No.: US 10,990,143 B2
(45) Date of Patent: Apr. 27, 2021

(54) PC MODULE ASSEMBLY

(71) Applicants: Guangzhou Shiyuan Electronics Co., Ltd., Guangzhou (CN); Guangzhou Shirui Electronics Co. Ltd., Guangzhou (CN)

(72) Inventors: Junjun Zhang, Guangzhou (CN); Fangguang Deng, Guangzhou (CN)

(73) Assignees: Guangzhou Shiyuan Electronics Co., Ltd., Guangzhou (CN); Guangzhou Shirui Electronics Co. Ltd., Guangzhou (CN)

( * ) Notice: Subject to any disclaimer, the term of this patent is extended or adjusted under 35 U.S.C. 154(b) by 0 days.

(21) Appl. No.: 16/347,068

(22) PCT Filed: Sep. 30, 2017

(86) PCT No.: PCT/CN2017/105039
§ 371 (c)(1),
(2) Date: May 2, 2019

(87) PCT Pub. No.: WO2018/090752
PCT Pub. Date: May 24, 2018

(65) Prior Publication Data
US 2020/0073449 A1    Mar. 5, 2020

(30) Foreign Application Priority Data
Nov. 17, 2016  (CN) .......................... 201621241421.4

(51) Int. Cl.
*G06F 1/16*    (2006.01)
*H05K 5/00*    (2006.01)
(Continued)

(52) U.S. Cl.
CPC ................. *G06F 1/20* (2013.01); *G06F 1/18* (2013.01); *H05K 7/20127* (2013.01)

(58) Field of Classification Search
CPC ........... H05K 7/20709; H05K 7/20718; H05K 7/20009; H05K 7/20127; H05K 7/20536;
(Continued)

(56) References Cited

U.S. PATENT DOCUMENTS 6,141,214 A     10/2000  Ahn
6,278,608 B1 *   8/2001  Ater ..................... H05K 7/1418
                                                          165/80.3
(Continued)

FOREIGN PATENT DOCUMENTS

CN        202372903 U     8/2012
CN         1414442 A      4/2013
(Continued)

OTHER PUBLICATIONS

International Application No. PCT/CN2017/105039, International Search Report dated Jan. 3, 2018, pp. 10.
(Continued)

*Primary Examiner* — Anthony M Haughton
(74) *Attorney, Agent, or Firm* — Zhong Law, LLC

(57) ABSTRACT

A PC module assembly, comprising a PC module support, the PC module support comprising a bottom wall and a first side wall, the first side wall being provided with a first air outlet, an air inlet of a heat dissipation structure communicatively connected to the first air outlet. When mounting of a PC module, the PC module is mounted on the bottom wall, enabling the position of an air outlet of the PC module to correspond to the position of the first air outlet. When the PC module is in an operating state, hot air flow formed by the heat generated inside the PC module enters the first air outlet, and is diverted through the heat dissipation structure, so that the heat is dissipated from the inside of the PC module, thereby allowing the PC module to operate in a stable manner.

10 Claims, 2 Drawing Sheets

(51) Int. Cl.
*H05K 7/00* (2006.01)
*G06F 1/20* (2006.01)
*G06F 1/18* (2006.01)
*H05K 7/20* (2006.01)

(58) Field of Classification Search
CPC .......... H05K 7/20545; H05K 7/20563; H05K 7/20554; H05K 7/20618
See application file for complete search history.

(56) References Cited

U.S. PATENT DOCUMENTS

| | | | | |
|---|---|---|---|---|
| 6,449,150 | B1* | 9/2002 | Boone | H05K 7/20563 |
| | | | | 165/104.33 |
| 6,795,314 | B1* | 9/2004 | Arbogast | H05K 7/20172 |
| | | | | 165/104.33 |
| 7,154,748 | B2* | 12/2006 | Yamada | H05K 7/20572 |
| | | | | 361/690 |
| 7,821,790 | B2* | 10/2010 | Sharma | H05K 7/1424 |
| | | | | 361/725 |
| 8,917,503 | B2 | 12/2014 | Chen | |
| 2008/0037218 | A1* | 2/2008 | Sharma | H05K 7/1424 |
| | | | | 361/695 |
| 2008/0158814 | A1* | 7/2008 | Hattori | H05K 7/20563 |
| | | | | 361/695 |
| 2009/0097200 | A1* | 4/2009 | Sharma | G06F 1/18 |
| | | | | 361/688 |
| 2010/0097754 | A1 | 4/2010 | Li et al. | |
| 2011/0122580 | A1 | 5/2011 | Guan | |

FOREIGN PATENT DOCUMENTS

| | | |
|---|---|---|
| CN | 203193672 U | 9/2013 |
| CN | 203387414 U | 1/2014 |
| CN | 206322089 U | 7/2017 |
| JP | 2005136236 A | 5/2005 |
| JP | 2013117980 A | 6/2013 |

OTHER PUBLICATIONS

Japanese Application No. 2019523160, Office Action dated Jan. 21, 2020, pp. 8.

* cited by examiner

PC MODULE ASSEMBLY

CROSS-REFERENCE TO RELATED APPLICATIONS

This application is a national stage of PCT/CN2017/105039 filed Sep. 30, 2017, which claims priority to Chinese application CN 201621241421.4 filed Nov. 17, 2016, the contents of which are hereby incorporated by reference in their entireties.

TECHNICAL FIELD

The disclosure relates to the technical field of display devices, in particular to a PC module assembly.

BACKGROUND

With the advance of science and technology and people's need, the function of interactive smartboards has become more powerful. Interactive smartboard is an integrated device that controls the content displayed on the display flat screen using touch technology, thus realizing human-computer interaction operations. The interactive smartboard may integrate the functions of a TV, a computer, a projector, an electronic whiteboard, an audio/video conferencing terminal, etc. To implement the functions of the interactive smartboard, different functional modules, such as a PC (Personal Computer) module, need to be installed in the interactive smartboard.

Since the PC module is generally installed inside the interactive smartboard, when the PC module is in an operating state, a large amount of heat may be generated, thereby producing a hot air flow. If the hot air flow cannot be timely diverted from the inside and around the PC module, the stable operation of PC module and further the stable operation of the interactive smartboard will be affected.

SUMMARY

The disclosure provides a PC module assembly to solve the technical problem that the heat of the PC module cannot be timely dissipated, thereby realizing the stable operation of the PC module.

In order to solve the above technical problem, the present disclosure provides a PC module assembly, including a PC module support. The PC module support may include a bottom wall and a first side wall, where the bottom wall is fixedly connected with the first side wall. A first air outlet is disposed on the first side wall. The PC module assembly may further include a heat dissipation structure, and an air inlet of the heat dissipation structure is communicatively connected to the first air outlet.

Preferably, the heat dissipation structure includes an air duct and an upper terminal holder, the air inlet of the air duct is communicatively connected to the first air outlet, and the upper terminal holder is provided with multiple heat dissipation holes, and the heat dissipation holes are communicatively connected to the air outlet of the air duct.

Preferably, the air duct is made of ethylene-vinyl acetate (EVA) material.

Preferably, the heat dissipation holes are elliptical.

Preferably, the first sidewall is provided with a first heat dissipation outlet.

Preferably, the PC module support is further provided with a second sidewall, and the second sidewall is provided with a second heat dissipation outlet.

Preferably, the PC module support is further provided with a first connector member, and one end of the PC module support is mounted on the wall hanging strip through the first connector member.

Preferably, the first connector member is L-shaped, and a vertical section of the first connector member is fixedly connected to the bottom wall, and a horizontal section of the first connector member is fixedly connected to the wall hanging strip.

Preferably, the PC module support is further provided with a second connector member, and the other end of the PC module support is mounted on a right terminal holder through the second connector member.

Preferably, the second connector is riveted to the right terminal holder by a rivet.

The disclosure provides a PC module assembly, which includes a PC module support. The PC module support includes a bottom wall and a first side wall. The first side wall is provided with a first air outlet, where the air inlet of a heat dissipation structure is communicatively connected to the first air outlet. When mounting the PC module, the PC module is mounted on the bottom wall, enabling the position of an air outlet of the PC module corresponding to the position of the first air outlet. When the PC module is in the operating state, the hot airflow in the form of a large amount of heat generated inside the PC module may enter the first air outlet and flow to outside through the heat dissipation structure, so that the heat is timely dissipated from the inside of the PC module to the outside, thereby allowing the PC module to operate in a stable manner.

Where, 1, PC module support; 11, bottom wall; 111, through hole; 12, first side wall; 121, first air outlet; 122, first heat dissipation outlet; 13, second side wall; 131, second heat dissipation outlet; 14, first connector member; 15, second connector member; 2, heat dissipation structure; 21, air duct; 22, upper terminal holder; 221, heat dissipation hole; 3, wall hanging strip; 4, right terminal holder.

DETAILED DESCRIPTION OF THE EMBODIMENTS

The specific embodiments of the present disclosure are further described in detail below with reference to the accompanying drawings and embodiments. The following embodiments are intended to illustrate the disclosure, but are not intended to limit the scope of the disclosure.

Figure 1:
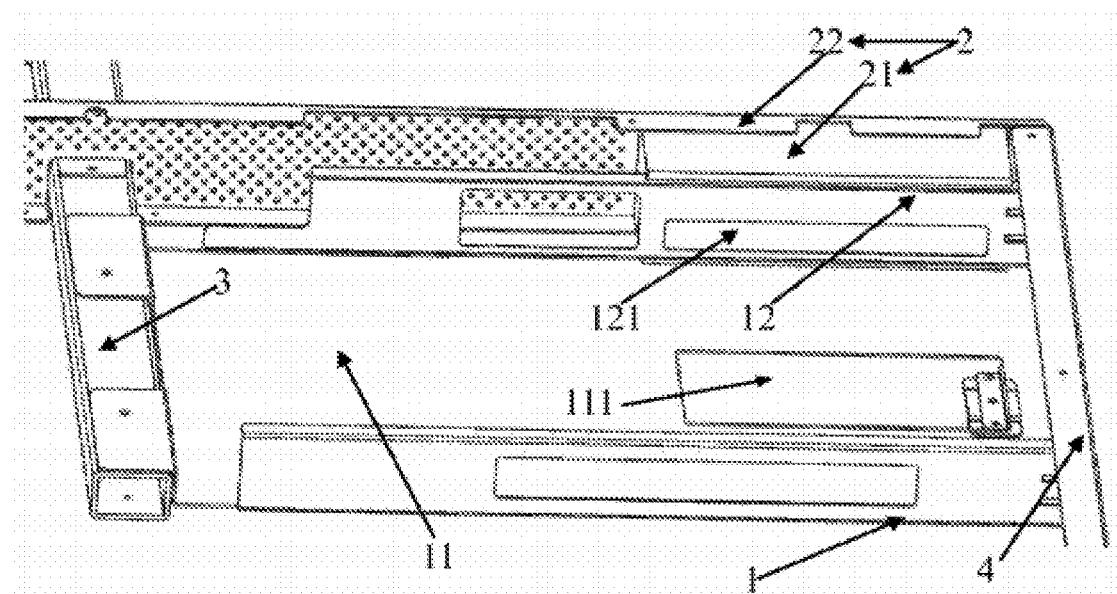
FIG. 1 is a schematic structural view of a PC module assembly in an embodiment of the present disclosure.
Figure 2:
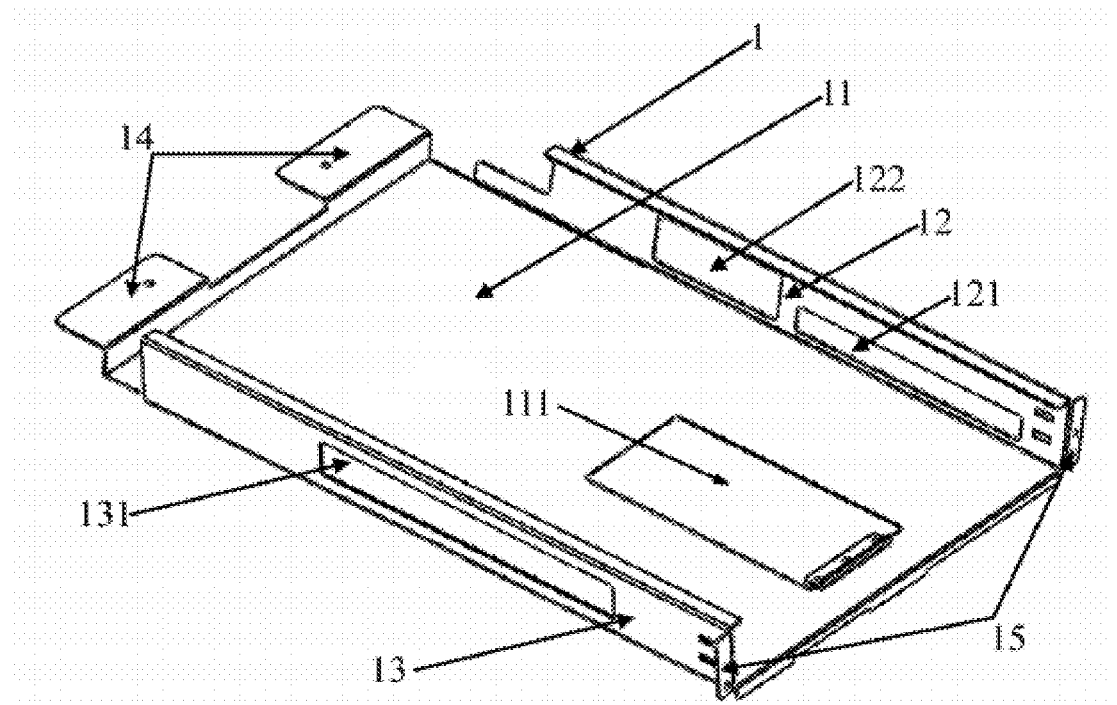
FIG. 2 is a schematic structural view of a PC module support in an embodiment of the present disclosure.
Figure 3:
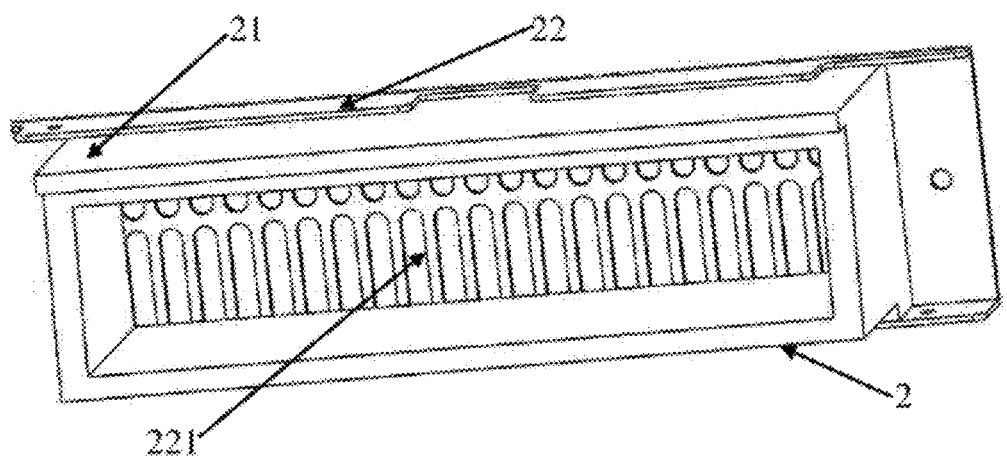
FIG. 3 is a schematic structural view of a heat dissipation structure in an embodiment of the present disclosure.

Referring to FIGS. 1 to 3, a PC module assembly of an embodiment of the present disclosure may include a PC module support 1 including a bottom wall 11 and a first side wall 12. The bottom wall 11 is fixedly connected to the first side wall 12, and the first air outlet 121 is disposed on the first side wall 12. The PC module assembly may further include a heat dissipation structure 2, and the air inlet of the heat dissipation structure 2 is communicatively connected to the first air outlet 121.

In the embodiment of the present disclosure, when mounting the PC module, the PC module is mounted on the bottom wall 12, enabling the position of an air outlet of the PC module to correspond to the position of the first air outlet. When the PC module is in the operating state, a hot air flow formed by a large amount of heat generated inside the PC module may enter the first air outlet 121, and is diverted to outside through the heat dissipation structure 2, so that the heat is timely dissipated from the inside of the PC module, thereby allowing the PC module to operate in a stable manner.

As shown in FIG. 1 and FIG. 3, in order to divert the hot air flow directly from the heat dissipation structure, prevent the hot air flow from flowing to other locations around the PC module, and thereby to further ensure the normal operation of the PC module, the heat dissipation structure 2 of the embodiment may include an air duct 21 and an upper terminal holder 22, where the air inlet of the air duct 21 is communicatively connected to the first air outlet 121, and the upper terminal holder 22 is provided with a plurality of heat dissipation holes 221. The heat dissipation holes 221 are communicatively connected to the air outlet of the air duct 21. When the hot air flow enters the first air outlet 121 from the air outlet of the PC module, the hot air flow is diverted from the air inlet of the air duct 21 to the air outlet of the air duct 21, and then is diverted out from the heat dissipation holes 221 of the upper terminal holder 22 to prevent the hot air flow from flowing to other positions around the PC module, thereby further ensuring stable operation of the PC module.

In the embodiment of the present disclosure, the material of the air duct 21 can be selected, according to the requirements of actual use, from suitable heat insulating materials including, such as, EVA, PU, and fiberglass cotton board. Preferably, the material of the air duct 21 in the present embodiment is EVA, and the heat of the hot air flow is isolated by the air duct 21 to prevent heat being transferred from the inside of the air duct 21 to the outside of the air duct 21. Thereby preventing heat of the hot air flow from being diffused to other locations around the PC module, thereby further ensuring stable operation of the PC module.

As shown in FIG. 3, in order to accelerate the hot air flow being diverted from the heat dissipation structure 2, the heat dissipation hole 221 in the present embodiment may be elliptical, and the elliptical design of the heat dissipation hole 221 can increase the area of the heat dissipation hole 221 so that the hot air flow can be diverted from the heat dissipation hole 221 faster.

As shown in FIG. 1 and FIG. 2, in order to dissipate heat generated from farther positions and other internal positions of the air outlet of the PC module faster, the first side wall 12 of the present embodiment is provided with a first heat dissipation outlet 122. The position of the first heat dissipation outlet 122 corresponds to the position of the first heat dissipation hole of the PC module, so that the heat inside the PC module may pass through the first heat dissipation hole of the PC module, and may be dissipated from the first heat dissipation outlet 122.

In the embodiment of the present disclosure, in order to further dissipate the heat inside the PC module, the PC module support 1 in this embodiment is further provided with a second sidewall 13, a second heat dissipation outlet 131 is disposed on the second sidewall 13, where the position of the first heat dissipation outlet 131 corresponds to the position of the second heat dissipation hole of the PC module, so that the heat inside the PC module may pass through the second heat dissipation hole of the PC module and may be dissipated through the second heat dissipation outlet 131.

As shown in FIG. 1 and FIG. 2, in order to facilitate the wiring of the FFC cable connected to the PC module, the PC module support 1 in this embodiment is further provided with a first connector member 14. One end of the PC module support 1 is mounted on the wall hanging strip 3 through the first connector member 14 such that a wiring space is formed underneath the lower surface of the bottom wall 11 so that the FFC cable may pass through the through hole 111 on the bottom wall 11 to outside of the PC module, thereby implementing the wiring of the FFC cable.

One embodiment of the present disclosure may use the existing structure of the interactive smartboard, namely the wall hanging strip 3, to implement the mount of one end of the PC module support 1 on the wall hanging strip 3, thereby further simplifying the structure. In some implementations, one end of the PC module support 1 can also be mounted on a mounting bracket or a mounting stud by adding the mounting bracket or the mounting stud, which is not discussed further in this disclosure.

As shown in FIG. 1 and FIG. 2, in order to make the structure more efficient so that one end of the PC module support 1 is securely mounted on the wall hanging strip 3 through the first connector member 14, the first connector member 14 of this embodiment is L-shaped, and the vertical portion of the first connector member 14 is fixedly connected to the bottom wall 11, and the horizontal portion of the first connector member 14 is fixedly connected to the wall hanging strip 3.

As shown in FIG. 1 and FIG. 2, in order to further make the structure more efficient so as to realize an un-wavering PC module support 1, the PC module support 1 in this embodiment is further provided with a second connector member 15. The other end of the PC module support 1 is mounted on the right terminal holder 4 using the second connector member 15, so that the PC module support 1 is securely mounted on the wall hanging strip 3 and the right terminal holder 4 in order to form a wiring space for the FFC cable, thereby facilitating the wiring for the FCC cable.

In the embodiment of the present disclosure, the second connector member 15 and the right terminal holder 4 can be connected in various manners including connection by bonding, connection by a fastener, or any other suitable connection manners. Preferably, the second connector member 15 in the present embodiment is riveted to the right terminal holder 4 using a rivet. The adoption of riveting to realize the connection between the second connector member 15 and the right terminal holder 4 by riveting may further simplify the structure.

The disclosure provides a PC module assembly, including a PC module support 1. The PC module support 1 includes a bottom wall 11 and a first side wall 12, where the first side wall 12 is provided with a first air outlet 121, and the air inlet of the heat dissipation structure 2 is communicatively connected to the first air outlet 121. When mounting a PC module, the PC module is mounted on the bottom wall 11, enabling the position of an air outlet of the PC module to correspond to the position of the first air outlet 121. When the PC module is in an operating state, the hot air flow formed by a large amount of heat generated inside the PC module enters the first air outlet 121 and is diverted through the heat dissipation structure 2, so that heat is timely dissipated from the inside of the PC module to the outside of the PC module assembly, thereby allowing the PC module to operate in a stable manner.

The above description is only a preferred embodiment of the present disclosure, and it should be noted that those skilled in the art can make several improvements and substitutions without departing from the technical principles of the present disclosure, and these improvements and substitutions should also be considered as the scope of protection of the present disclosure.

What is claimed is:

1. A PC module assembly, comprising:
a PC module support, the PC module support comprising a bottom wall and a first side wall, wherein the bottom wall is fixedly connected to the first side wall, the first side wall is provided with a first air outlet; and
a heat dissipation structure, the heat dissipation structure comprising an air duct, the air duct comprising an air inlet and an air outlet, wherein the air inlet of the air duct is communicatively connected to the first air outlet provided by the first side wall, a hot air flow is diverted from the air inlet of the air duct to the air outlet of the air duct, and the air duct is made from an insulating material that isolates the hot air flow from being diffused or transferred to outside walls of the air duct to other locations inside the PC module.

2. The PC module assembly according to claim 1, wherein the heat dissipation structure further comprises an upper terminal holder, wherein the upper terminal holder is provided with a plurality of heat dissipation holes, and the plurality of heat dissipation holes are communicatively connected to the air outlet of the air duct.

3. The PC module assembly according to claim 2, wherein the air duct is made of ethylene-vinyl acetate (EVA) material.

4. The PC module assembly according to claim 2, wherein said heat dissipation holes are elliptical.

5. The PC module assembly according to claim 1, wherein the first side wall is provided with a first heat dissipation outlet.

6. The PC module assembly according to claim 1, wherein the PC module support is further provided with a second side wall, and the second side wall is provided with a second heat dissipation outlet.

7. The PC module assembly according to claim 1, wherein the PC module support is further provided with a first connector member, and a first end of the PC module support is mounted on a wall hanging strip through the first connector member.

8. The PC module assembly according to claim 7, wherein said first connector member is L-shaped, and a vertical portion of the first connector member is fixedly connected to the bottom wall, a horizontal portion of the first connector member is fixedly connected to the wall hanging strip.

9. The PC module assembly according to claim 8, wherein the PC module support is further provided with a second connector member, and a second end of the PC module support is mounted on a side terminal holder through the second connector member.

10. The PC module assembly according to claim 9, wherein the second connector member is riveted to the right terminal holder by a rivet.

* * * * *